(12) United States Patent
Le et al.

(10) Patent No.: US 6,237,081 B1
(45) Date of Patent: May 22, 2001

(54) QUEUING METHOD AND APPARATUS FOR FACILITATING THE REJECTION OF SEQUENTIAL INSTRUCTIONS IN A PROCESSOR

(75) Inventors: Hung Qui Le; Larry Edward Thatcher; Bruce Joseph Ronchetti; David James Shippy, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,319

(22) Filed: Dec. 16, 1998

(51) Int. Cl.[7] ........................................... G06F 9/32
(52) U.S. Cl. ............................. 712/214; 712/205
(58) Field of Search .................... 712/205, 206, 712/207, 214, 215

(56) References Cited

U.S. PATENT DOCUMENTS 5,548,735 * 8/1996 Chen et al. ............................. 710/7
5,784,603 * 7/1998 Leung et al. ........................... 712/23
6,098,166 * 8/2000 Leibholz et al. ...................... 712/216

* cited by examiner

*Primary Examiner*—Richard L. Ellis
(74) *Attorney, Agent, or Firm*—Russell D. Culbertson; Shaffer & Culbertson, LLP; Casimer K. Salys

(57) ABSTRACT

A processor (100) includes an issue unit (125) having an issue queue (144) for issuing instructions to an execution unit (140). The execution unit (140) may accept and execute the instruction or produce a reject signal. After each instruction is issued, the issue queue (144) retains the issued instruction for a critical period. After the critical period, the issue queue (144) may drop the issued instruction unless the execution unit (140) has generated a reject signal. If the execution unit (140) has generated a reject signal, the instruction is eventually marked in the issue queue (144) as being available to be reissued. The length of time that the rejected instruction is held from reissue may be modified depending upon the nature of the rejection by the execution unit (140). Also, the execution unit (140) may conduct corrective actions in response to certain reject conditions so that the instruction may be fully executed upon reissue.

20 Claims, 3 Drawing Sheets

QUEUING METHOD AND APPARATUS FOR FACILITATING THE REJECTION OF SEQUENTIAL INSTRUCTIONS IN A PROCESSOR

TECHNICAL FIELD OF THE INVENTION

This invention relates generally to the field of processors which support out-of-order execution of instructions and, more particularly, to a method and apparatus in which dispatched instructions may be rejected by an execution unit.

High-performance processors may be capable of "superscalar" operation and may have "pipelined" elements. A superscalar processor has multiple elements which operate in parallel to process multiple instructions in a single processing cycle. Pipelining involves processing instructions in stages. The pipelined stages may process a number of instructions concurrently.

In a typical first stage, referred to as an "instruction fetching" stage, an instruction is fetched from memory. In a "decode" stage, the instruction is decoded into different control bits. These control bits may, for example, designate the functional unit for performing the operation specified by the instruction, source operands for the operation, and a destination for the results of the operation. After the decode stage, the decoded instruction enters a "dispatch" stage from which the instruction is dispatched to an execution unit for performing an "execution" stage. An issue queue may be associated with the execution unit for temporarily holding the dispatched instructions prior to execution. In any case, the execution stage processes the operation specified by the instruction. Processing an operation specified by an instruction includes accepting one or more operands and producing one or more results.

Instructions to be processed may originally be prepared for processing in some programmed, logical sequence. However, at least in some respects, the instructions may be processed in a sequence different from the original sequence. This type of processing may be referred to as "out-of-order" processing. Complications arise in out-of-order processing because instructions are not totally independent of each other. That is, the processing of one instruction may depend on a result from another instruction. For example, the processing of an instruction which follows a branch instruction will depend on the branch path chosen by the branch instruction. In another example, the processing of an instruction which reads the contents of a memory element depends on the result of a preceding instruction which writes information to that memory element.

Regardless of the order in which instructions should be executed, or are preferably executed, execution units employed in prior systems have either accepted the instruction unconditionally or generated a "busy" condition. The execution unit processed all instructions which were unconditionally accepted unless the instruction required some condition which was not satisfied at that time. These unconditional acceptance-type systems required some mechanism for dealing with the situation in which the instruction could not be properly executed, such as when the instruction required data which was not yet available. These systems provided means for restoring some previous state in the processor to recover from the execution error caused by the attempt to execute the unconditionally accepted instruction.

A "busy" condition stopped the issue of all instructions to the busy execution unit. In some processing schemes, the issue queue responded to a busy condition by simply holding all instructions until the particular execution unit was not busy. Another method for responding to a busy condition in an execution unit was to abort the instruction that caused the unit to be busy, delete it and all younger instructions, re-fetch and re-dispatch the deleted instructions, and then re-issue the instructions in a different order to avoid the busy condition. In either case, allowing the execution unit to generate a busy condition resulted in an unacceptable penalty on processing speed.

SUMMARY OF THE INVENTION

It is an object of the invention to provide a method and apparatus for overcoming the above-described problems associated with processors which support out-of-order execution of instructions. More particularly, it is an object of invention to provide a method and apparatus for allowing an execution unit to reject an instruction while continuing to process additional instructions.

The method according to the invention includes storing an instruction in an issue queue associated with an issue unit, and then issuing the stored instruction from the issue queue to an execution unit responsible for executing the instruction. A counter associated with the issue queue counts pipeline stages occurring after the instruction is issued from the queue. Also, the issue unit monitors for a reject indication for the issued instruction. The execution unit produces a reject indication in the event that a reject condition is detected as the unit attempts to execute the instruction. The issue queue retains the instruction for a critical period after the instruction is issued. This critical period may be defined in terms of pipeline stages which have occurred after the instruction is issued. If the execution unit does not detect a reject condition during the critical number of pipeline stages, the issue unit may remove the instruction from the issue queue. However, if a reject condition is detected within the critical number of pipeline stages after the instruction is issued, then the instruction remains in the issue queue to be reissued at a later time.

By retaining the instruction in the issue queue for the critical number of pipeline stages after issuance, the instruction remains available in the event that the instruction cannot be processed at that time, or is preferably processed at another time. That is, retaining the instruction in the issue queue for the critical number of pipeline stages or critical period allows the execution unit to drop the issued instruction without requiring that the instruction be re-dispatched and without stopping further issues from the issue queue. The execution unit continues to process the next issued and unrejected instruction and the rejected instruction remains in the issue queue to be reissued at a later time.

In the preferred form of the invention, the critical period comprises a critical number of pipeline stages during which a reject condition for the instruction is expected if such a reject condition is to occur. In one form of the invention, the critical number of pipeline stages is a fixed number for each instruction stored in the issue queue. In other forms of the invention, the critical number of pipeline stages may vary depending upon the type of instruction. Other forms of the invention may hold a rejected instruction from reissuance for a predefined correction period after the critical period in order to give the execution unit time to take some corrective action to prevent the reject condition from occurring when the instruction is reissued. In any of these cases, the counter preferably uses a counter field associated with the instruction in the issue queue. The counter field is set to the critical number of pipeline stages when the instruction is issued and then decremented upon the occurrence of each pipeline stage after issuance. Thus, the value of the counter field for an issued instruction can be used to determine if the critical number of pipeline stages have occurred.

These and other objects, advantages, and features of the invention will be apparent from the following description of the preferred embodiments, considered along with the accompanying drawings.

DESCRIPTION OF THE PREFERRED EMBODIMENTS

Figure 1:
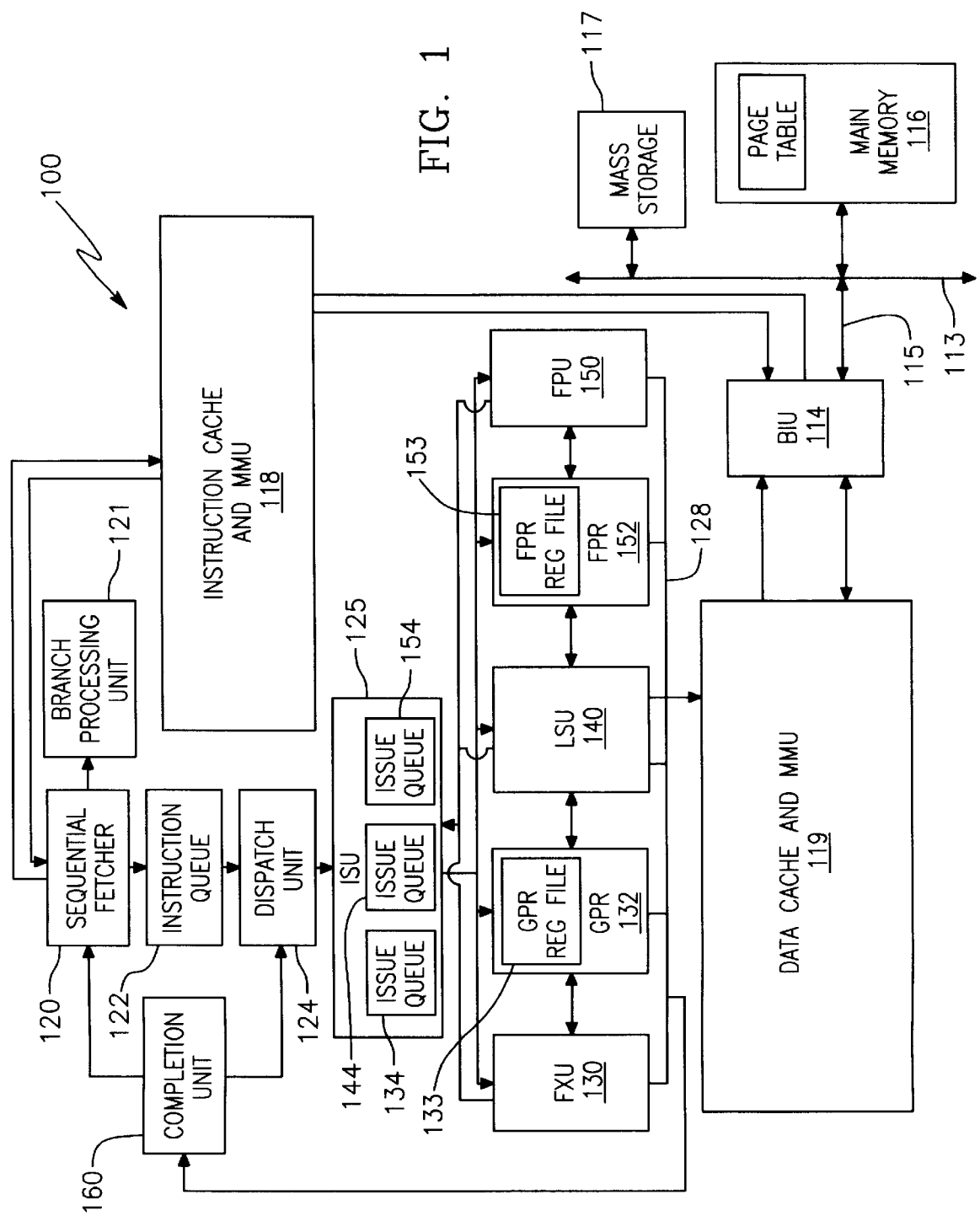
FIG. 1 is a block diagram of a processor embodying the principles of the invention.

FIG. 1 illustrates a processor 100. Processor 100 includes issue unit (ISU) 125 which will be described in detail below with reference to FIG. 2. ISU 125 gives execution units 130, 140, and 150 the ability to reject instructions. Rejected instructions remain in ISU 125 to be reissued at a later time.

In the illustrative embodiment shown in FIG. 1, processor 100 comprises a single integrated circuit superscalar microprocessor. Accordingly, processor 100 includes various execution units, registers, buffers, memory devices, and other functional units, which are all formed by integrated circuitry. Of course, although the invention is described herein as applied to a microprocessor, the present instruction handling scheme is not limited to microprocessors and may be implemented in other types of processors.

As illustrated in FIG. 1, processor 100 is coupled to system bus 113 via bus interface unit (BIU) 114 and processor bus 115. Both system bus 113 and processor bus 115 include address, data, and control buses which are not shown separately. BIU 114 participates in bus arbitration to control the transfer of information between processor 100 and other devices coupled to system bus 113, such as main memory 116 and non-volatile mass storage 117. The data processing system illustrated in FIG. 1 preferably includes other devices coupled to system bus 113; however, these other devices are not necessary for an understanding of the invention and are accordingly omitted from the drawings so as not to obscure the invention in unnecessary detail.

BIU 114 is connected to instruction cache and MMU (memory management unit) 118 and data cache and MMU 119. High-speed caches, such as those within instruction cache and MMU 118 and data cache and MMU 119, enable processor 100 to achieve relatively fast access times to a subset of data or instructions previously transferred from main memory 116 to the caches, thus improving the overall processing speed. Data and instructions stored within the data cache 119 and instruction cache 118, respectively, are each identified and accessed by an effective address, which is related to the real address of the respective data or instructions in main memory 116.

Instruction cache and MMU 118 is further coupled to sequential fetcher 120, which fetches instructions for execution from instruction cache and MMU 118 during each processor cycle. Sequential fetcher 120 transmits branch instructions fetched from instruction cache and MMU 118 to branch processing unit (BPU) 121 for execution, and temporarily stores sequential instructions within instruction queue 122 for eventual transfer to dispatch unit 124 for decoding and dispatch to the instruction issue unit (ISU) 125.

In the depicted illustrative embodiment, in addition to BPU 121, the execution circuitry of processor 100 comprises multiple execution units for executing sequential instructions, including fixed-point unit (FXU) 130, load-store unit (LSU) 140, and floating-point unit (FPU) 150. Each execution unit 130, 140, and 150 typically executes one or more instructions of a particular type during each processor cycle.

FXU 130 performs fixed-point mathematical and logical operations such as addition, subtraction, ANDing, ORing, and XORing, utilizing source operands received from specified general-purpose registers (GPRs) 132. Following the execution of a fixed-point instruction, FXU 130 outputs the data results of the instruction on result bus 128 to a GPR register file 133 associated with GPRs 132.

FPU 150 typically performs single and double-precision floating-point mathematical and logical operations, such as floating-point multiplication and division, on source operands received from floating-point registers (FPRs) 152. FPU 150 outputs data resulting from the execution of floating-point instructions on result bus 128 to a FPR register file 153, which temporarily stores the result data.

LSU 140 typically executes floating-point and fixed-point instructions which either load data from memory or which store data to memory. For example, an LSU instruction may load data from either the data cache and MMU 119 or main memory 116 into selected GPRs 132 or FPRs 152. Other LSU instructions may store data from a selected GPR 132 or FPR 152 to main memory 116.

Processor 100 employs both pipeline and out-of-order execution of instructions to further improve the performance of its superscalar architecture. As is typical of high-performance processors, each sequential instruction is processed at five distinct pipeline stages, namely, fetch, decode/dispatch, execute, finish, and completion. Instructions can be executed by FXU 130, LSU 140, and FPU 150 in any order as long as data dependencies are observed. Within individual execution units, 130,140, and 150, instructions are also processed in a sequence of pipeline stages unique to the particular execution unit.

During the fetch stage, sequential fetcher 120 retrieves one or more instructions associated with one or more memory addresses from instruction cache and MMU 118. Sequential fetcher 120 stores sequential instructions fetched from instruction cache and MMU 118 within instruction queue 122. Branch instructions are removed or folded out by sequential fetcher 120 to BPU 121 for execution. BPU 121 includes a branch prediction mechanism (not shown separately) which, in one embodiment, comprises a dynamic prediction mechanism such as a branch history table. This branch history table enables BPU 121 to speculatively execute unresolved conditional branch instructions by predicting whether or not the branch will be taken.

During the decode/dispatch stage, dispatch unit 124 decodes and dispatchs one or more instructions from instruction queue 122 to ISU 125. ISU 125 includes a plurality of issue queues 134, 144, and 154, one issue queue for each execution unit 130, 140, and 150. ISU 125 also includes circuitry for receiving information from each execution unit 130, 140, and 150 and for controlling the issue queues 134, 144, and 154. According to the invention, instructions for each respective execution unit 130, 140, and 150 are stored in the respective issue queue 134, 144, and 154, and then issued to the respective execution unit to be processed. However, instructions are dropped or removed from the issue queues 134, 144, or 154 only after the issued instruction is fully executed by the respective execution unit 130, 140, or 150.

During the execution stage, execution units 130, 140, and 150 execute instructions issued from their respective issue queues 134, 144, and 154. As will be described below, each execution unit according to the invention may reject any issued instruction without fully executing the instruction. However, once the issued instructions are executed and that execution has terminated, execution units 130, 140, and 150 store the results, if any, within either GPRs 132 or FPRs 152, depending upon the instruction type. Execution units 130, 140, and 150 also notify completion unit 160 that the instructions have finished execution. Finally, instructions are completed in program order out of a completion buffer (not shown separately) associated with the completion unit 160. Instructions executed by FXU 130 are completed by releasing the old physical register associated with the destination GPR of the completed instructions in a GPR rename table (not shown). Instructions executed by FPU 150 are completed by releasing the old physical register associated with the destination FPR of the completed instructions in a FPR rename table (not shown). Load instructions executed by LSU 140 are completed by releasing the old physical register associated with the destination GPR or FPR of the completed instructions in the GPR or FPR rename table (not shown). Store instructions executed by LSU 140 are completed by marking the finished store instructions as completed in a store queue (not shown). Completed store instructions in the store queue will eventually be written to memory.

The invention will be described below with reference specifically to one execution unit, LSU 140, along with ISU 125 and issue queue 144. However, those skilled in the art will appreciate that the same instruction rejection technique described below with reference to LSU 140 may also be employed with FXU 130 and FPU 150, or with any other execution unit associated with a processor. Also, the operation of ISU 125 is described below specifically with reference to the load pipeline stages performed by LSU 140. Of course, the pipeline stages associated with other LSU operations and the operation of the other execution units will be different from those described below and illustrated for purposes of example. The invention is not limited to the particular LSU operation described below. Other LSU pipeline stages as well as the pipeline stages performed by other execution units are to be considered equivalents to the illustrated examples.

As will be discussed in detail below, each instruction in issue queue 144 is retained for at least a critical period after it is issued to LSU 140. An instruction is removed from the issue queue 144 only after the instruction is fully executed by LSU 140. For the purposes of this disclosure and the following claims, the word "retain" means that the instruction is held or stored in some fashion which will enable it to be reissued at a later time if necessary. That an instruction is retained does not necessarily mean that the instruction is held in the same physical location or even held in the same storage device. Furthermore, the word "remove" as used in this disclosure and the following claims means that the instruction is either overwritten or deleted, or marked to be deleted or overwritten.

Figure 2:
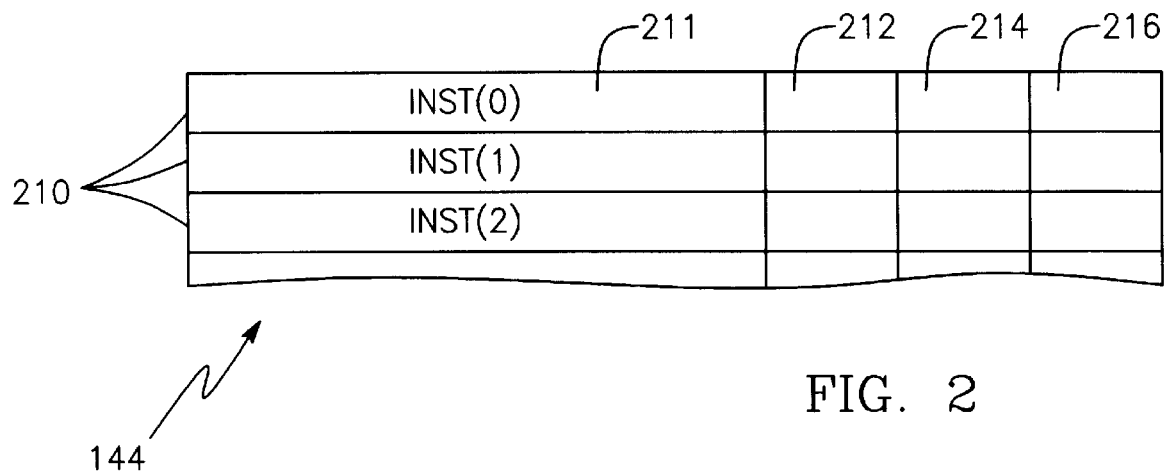
FIG. 2 is a diagrammatic representation of a portion of an issue queue embodying the principles of the invention.

Referring particularly to FIG. 2, issue queue 144 comprises a memory device for storing a number of lines or entries 210. Although only three entries are shown in FIG. 2 to illustrate the invention, issue queue 144 may contain any number of entries 210. Each entry 210 is for a particular instruction to be executed and includes several different fields. Field 211 contains the instruction to be executed. It will be understood that field 211 may actually contain several different fields which each contain a portion of the instruction such as the operational code for the instruction, location of operands, etc. Field 212 comprises a counter field which is used to count the occurrence of pipeline stages as will be discussed further below. Field 214 comprises an availability field which indicates whether the instruction is or is not available to be issued. In the form of the issue queue 144 shown in FIG. 2, each entry 210 also includes a reissue counter field 216.

Entries 210 which include an "available" indicator in their respective availability field 214 comprise a pool of instructions in the issue queue 144 which are available for issue or re-issue to LSU 140. In the preferred form of the invention, the availability field comprises several bits. One bit in the availability field comprises an issue_valid bit which is used to store one indicator that the entry is available to be issued. Availability field 214 also preferably includes multiple bits to indicate if each operand used by the instruction is ready. A logical state "1", for example, of all bits in the availability field 214 may provide the "available" indicator, indicating that the instruction stored at this entry is available to be issued. The opposite logical state "0" of any bit of field 214 indicates that the instruction stored at this entry is not available to be issued. When an instruction is dispatched from dispatch unit 124 to issue queue 144, the issue_valid bit of the entry 210 receiving the dispatched instruction is set to an active logical state. An active issue_valid bit in the availability field 214 of an entry 210 indicates that the instruction in that entry needs to be issued or reissued as will be discussed below.

Issue queue 144 receives instructions dispatched from dispatch unit 124 in the top entry 210, the entry containing INST(0) in FIG. 2. In every cycle, instructions in issue queue 144 trickle toward the bottom of the queue. From the pool of available instructions as indicated by availability field 214, the bottom most instruction is selected to be issued to the LSU 140. This arrangement ensures that the oldest available instructions are selected to be issued.

Figure 3:
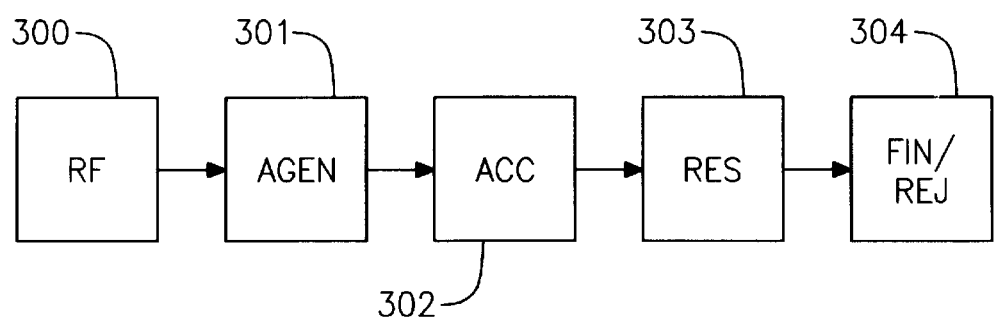
FIG. 3 is a diagrammatic representation of pipeline stages according to one embodiment of the invention.

When an instruction in an entry 210 in issue queue 144 is issued to LSU 140, the counter field 212 of that entry is set to a predetermined number that corresponds to one more than the pipeline stages of the LSU 140. This number of stages represents a critical count or period during which the issue queue entry 210 and instruction is to be retained in the issue queue 144. The issue_valid bit of field 214 in the entry being issued is also set to "unavailable" when the instruction in an entry 210 is issued to LSU 140. This "unavailable" state is the opposite logical state to "active", and removes that particular entry and instruction from the pool of available instructions to be issued. The issued instruction then goes through the pipeline stages of LSU 140. The LSU pipeline stages in one preferred form of invention are shown in FIG. 3. Upon the occurrence of the each LSU pipeline stage, ISU 125 decrements the counter field 212 associated with each instruction which is currently going through the pipeline stages, that is, the counter field of each entry 210 which has an issue_valid bit set to "unavailable" in the availability field 214. Thus, at each point in the load/store execution process, the counter field 212 for each issued entry 210 indicates how many stages remain for the issued instruction to be properly executed.

Referring to FIG. 3, the illustrated pipeline stages performed by LSU 140 comprise a register file access stage (RF) 300, address generation stage (AGEN) 301, access stage (ACC) 302, result stage (RES) 303, and finish/reject stage 304. In the register file access stage 300, GPR register file 133 reads the operands specified in the instruction to LSU 140. The operands are added in the address generation stage 301 to produce an effective address of the data to be loaded. In the access stage 302, LSU 140 converts the effective address to the real address of the data in the level 1 (L1) cache included in data cache and MMU 119. This address conversion takes place in an effective to real address translation (ERAT) look aside buffer (not shown) included in LSU 140. In access stage 302, LSU 140 also looks for data in the L1 cache matching the real address returned from the ERAT look aside buffer. In the result stage 303, LSU 140 returns data from the specified effective address in L1 cache to GPR register file 133 as well as all execution units so that subsequent instructions that use the load data can be executed. Finally, in the finish/reject stage 304, LSU 140 either provides a finish signal for completion unit 160 or provides a reject indication for ISU 125. LSU 140 produces a finish signal only when the instruction has been fully executed and LSU detects no reject conditions during any of the LSU pipeline stages. LSU 140 produces a reject indication for ISU 125 in the event that LSU 140 detects a reject condition during any of the LSU pipeline stages for the particular instruction. The reject indication is specific to the particular instruction for which the reject condition has occurred. LSU 140 includes logic circuitry to detect any number of reject conditions. A reject condition may be detected at any stage as a load or store proceeds through the pipeline stages (for example, the load stages set out in FIG. 3).

Regardless of the type of reject condition detected, the resulting reject indication from LSU 140 includes at least a reject signal directed to ISU 125. In one form of the invention, ISU 125 responds to an active reject signal by toggling the issue_valid bit (in availability field 214) in the issue queue entry 210 associated with that particular issued instruction. That is, when LSU 140 issues a reject signal for an instruction during the finish/reject stage for that instruction, ISU 125 may change the issue_valid bit in field 214 associated with that instruction to the "active" logical state, indicating that the instruction needs to be reissued. In this form of the invention, the rejected instruction is once again immediately available to be issued when its associated counter field 212 becomes "0". If the instruction is the oldest in the issue queue 144, it will be re-issued in that cycle. ISU 125 identifies the rejected instruction by examining counter field 212. The entry with a value "1" in counter field 212 contains the rejected instruction.

In a preferred form of the invention, the reject indication includes both a reject signal and a reissue count value. If an instruction is rejected in this form of the invention, LSU 140 notifies ISU 125 by activating a reject signal and sending a reissue count value to indicate how many cycles later the instruction should be reissued. This reissue count value is stored in reissue counter field 216 of the entry 210 containing the rejected instruction. Normally this reissue count value is "1", however there are cases in which a larger value is returned by LSU 140. For example, LSU 140 may generate a reject signal when the LSU detects in access stage 302 (FIG. 3) that the ERAT look aside buffer does not contain a translation from the effective address for the instruction to the real address in L1 cache. Other important examples in which the reissue count value is preferably greater that 1 are a load-hit-store (LHS) condition and a MMU busy condition. A LHS condition is where an older store is pending a write to the L1 cache and a load is executing. The load will reject until the store data is in the L1 cache and can be read by the load in the access stage (302 in FIG. 3). A MMU busy condition is where a load L1 cache miss can not be accepted by the MMU associated with data cache 119. The load is then rejected until the MMU busy condition clears. In any case, the reissue count value is pre-programmed in the LSU 140 logic so that the LSU returns a given reissue count value in response to a given reject condition. As will be discussed in detail below, a reissue count greater than "1" causes the issue queue 144 to hold the rejected instruction for an additional period before it is available for reissue. The additional period may comprise a corrective period which allows LSU 140 to take some corrective action to prevent the instruction from being rejected again when reissued.

Regardless of the value of the reissue count value issued by LSU 140 in the preferred form of the invention, ISU 125 responds to the reject signal by setting the reissue count field 216 associated with the rejected instruction to the reissue count value sent by the LSU. Thereafter, ISU 125 decrements the value in the reissue counter field 216 every cycle. When the value in the reissue counter field 216 reaches "0" ISU 125 toggles the issue_valid bit in availability field 214. Thus, when reissue counter field 216 reaches the value "0", the rejected, unexecuted instruction is once again marked in issue queue 144 as "active" and available for issue. Thus, the instruction which has been rejected re-enters the pool of available instructions to be issued.

To determine if an issued instruction has encountered a reject condition, logic associated with ISU 125 first examines the counter field 212 of each issue queue entry 210 each cycle to identify the issued instruction reaching the finish/reject stage in LSU 140 in that cycle. A value of "1" in the counter field 212 of an entry 210 indicates that the instruction associated with that entry is at the finish/reject stage (304 in FIG. 3). At that point, ISU 125 checks the reject signal from LSU 140 to determine if the reject signal from LSU 140 is active. If the reject signal is active, the particular instruction has not been executed successfully. If, however, the reject signal is not active when checked by ISU 125 for a particular instruction, then the instruction has been successfully executed.

ISU 125 responds to an active reject signal by loading the reissue count being sent from LSU 140 into the reissue counter field 216 of the entry 210 in issue queue 144 that contains: (1) an "unavailable" issue_valid bit in availability field 214, and (2) a value of "1" in counter field 212. In subsequent cycles, counter field 212 and reissue counter field 216 are both decremented by 1 each cycle until each field reaches "0". When reissue counter field 216 of an entry 210 reaches a value of "1", ISU 125 sets the issue_valid bit in availability field 214 of that entry to "active" in the next cycle thus marking the instruction at that entry available for reissue.

If, on the other hand, the reject signal from LSU 140 is not active when ISU 125 checks for a particular entry 210 in issue queue 144, the instruction has been executed successfully. In that case, the reissue counter field 216 of that entry 210 is not changed, and continues to contain the value "0". In the subsequent cycle, the value of counter field 212 for the entry also goes to "0". ISU 125 examines all entries 210 in issue queue 144 every cycle and deallocates entries with an "unavailable" issue_valid bit in availability field 214, a value of "0" in counter field 212 and, a value of "0" in reissue counter field 216, thereby effectively removing these entries and their respective instruction.

Those skilled in the art will appreciate that an execution unit such as LSU 140 may produce a reject signal in any number of conditions. For example, a reject condition may be a condition which prevents the instruction from being executed properly. However, the invention is not limited to such catastrophic conditions. Rather, the execution unit may be adapted to produce a reject signal if it is only undesirable to execute the instruction at the particular time. These non-critical rejects may allow the particular execution unit to operate in a more optimal manner to execute the issued instructions.

Furthermore, when an execution unit such as LSU 140 rejects an instruction according to the invention, the execution unit may initiate an action to clear the reject condition. Sometime later the reject condition will clear and the rejected instruction will successfully execute. Up to the point at which the reject condition clears, the instruction may experience any number of rejects in execution unless the instruction is prevented from being reissued until the reject condition clears as will be discussed further below with reference to FIG. 4.

Figure 4:
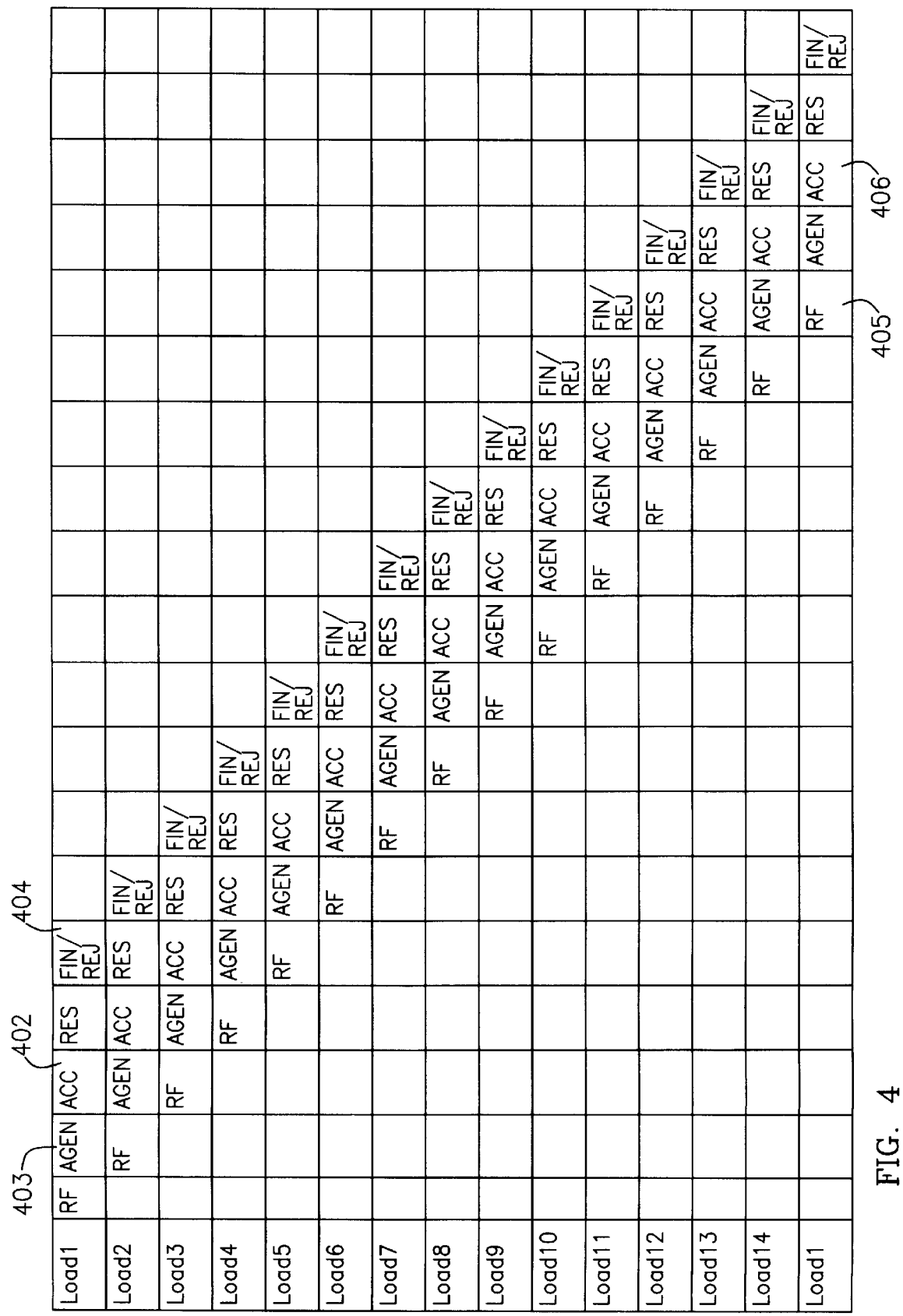
FIG. 4 it is a diagrammatic representation of a series of load operations and a corrective action taken by the execution unit in response to a reject condition.

An example of a corrective action which LSU 140 takes in response to an instruction reject condition may be described with reference to FIG. 4. FIG. 4 illustrates the load pipeline stages for a series of load instructions represented in the drawing as LOAD1 through LOAD14. Each load instruction LOAD1 through LOAD14 goes through the five pipeline stages RF, AGEN, ACC, RES, and finish/reject (FIN/REJ) discussed above with reference to FIG. 3. Each of the load instructions in FIG. 4 is executed successfully except for LOAD1. During the ACC pipeline stage for LOAD1, 402 in FIG. 4, LSU 140 detects that the ERAT buffer (not shown) does not contain a translation for the effective address produced for the LOAD1 instruction in the AGEN stage 403. LSU 140 recognizes this condition as a reject condition and produces a reject indication in the finish/reject stage for LOAD1, shown at reference number 404 in FIG. 4.

In this form of the invention, the LSU 140 reject indication includes an active reject signal and a reissue count for storage in reissue counter field 216 described above with reference to FIG. 2. The reissue counter value comprises a value intended to prevent the instruction LOAD1 from being reissued from the issue queue 144 (FIGS. 1 and 2) until LSU 140 has taken a corrective action to prevent another rejection of LOAD1. In this example, the corrective action comprises a translation request to a translation unit (not shown) associated with LSU 140. The translation unit responds to the request by updating the ERAT buffer (not shown) associated with LSU 140. After this ERAT update, the ERAT buffer includes the desired real address and thus instruction LOAD1 will not produce an ERAT miss rejection condition in the ACC stage, and will execute successfully. In the illustrated example, the translation unit requires eleven stages to respond to the translation request.

In the example illustrated in FIG. 4, the reissue count returned from LSU 140 to ISU 125 has the value "9". As discussed above with reference to FIG. 2, ISU 125 responds to the active reject signal for the LOAD1 instruction by storing the reissue count value, "9" in this case, in the reissue counter field 216 associated with the issue queue entry 210 for the LOAD1 instruction. In each subsequent stage, ISU 125 decrements this reissue count value until the value becomes "0" and at that time, toggles the issue_valid bit value (field 214) for the LOAD1 instruction to "active". Thus, the LOAD1 instruction is marked available for reissue and is reissued on the next cycle to the RF stage at point 405. At this point, the ERAT buffer has been updated with the desired real address and therefore the LOAD1 instruction will not suffer another ERAT miss reject condition in the ACC stage 406.

It will be noted that the number of pipeline stages required for an execution unit such as LSU 140 to complete a corrective action will, in many cases, be speculative. In the ERAT miss example, the translation unit may not be able to respond and update the ERAT buffer in eleven pipeline stages as illustrated in FIG. 4. The eleven pipeline stages set out in the figure presumes that the translation unit is able to retrieve the requested real address from a translation look aside buffer (not shown). However, where the translation look aside buffer does not contain the desired real address, the translation unit must go through a table walk operation which may take many pipeline stages. In any event, the reissue count value which the execution unit returns to ISU 125 represents simply a projection of the number of pipeline stages to delay the reissuance of the particular rejected instruction. If the delay is not long enough, the instruction will simply be rejected again. However, it is a major advantage of the present invention that regardless of the nature of the reject condition or the number of pipeline stages required to clear the reject condition, the execution unit continues to execute other instructions from the issue queue while the execution unit is taking steps to clear the reject condition.

The above described preferred embodiments are intended to illustrate the principles of the invention, but not to limit the scope of the invention. Various other embodiments and modifications to these preferred embodiments may be made by those skilled in the art without departing from the scope of the following claims. For example, the LSU 140 logic may be adapted to detect substantially any type of condition in any LSU pipeline stage which prevents the execution or optimal execution of a particular instruction. Any such condition is to be considered an equivalent of the illustrative ERAT miss condition discussed above. Also, although the issue queue 144 counting arrangement described above with reference to FIG. 2 is preferred, any other pipeline stage counting scheme may be employed within the scope of the invention as defined in the following claims. Additionally, an instruction rejection system according to the invention need not define the critical period in terms of pipeline stages. Rather, the critical period may be measured by any suitable means.

What is claimed is:

1. A method for facilitating the rejection of sequential instructions to be executed in a processor, the method comprising the steps of:
 (a) storing a sequential instruction in an issue queue;
 (b) issuing the instruction from the issue queue for execution by an execution unit; and
 (c) retaining the instruction in the issue queue for a critical period after the instruction is issued, the critical period comprising a period of time in which a reject signal for the instruction is expected, the reject signal for the instruction being asserted when a reject condition for the instruction is detected by the execution unit to which the instruction was issued.

2. The method of claim 1 wherein the critical period is defined by a critical number of pipeline stages.

3. The method of claim 2 further comprising the step of:
(a) removing the instruction from the issue queue when the execution unit fails to produce the reject signal for the instruction during a critical pipeline stage, the critical pipeline stage comprising the final stage of the critical number of pipeline stages after the instruction was issued.

4. The method of claim 2 wherein the critical number of pipeline stages is a fixed number for each instruction stored in the issue queue.

5. The method of claim 2 wherein storing the instruction in the issue queue comprises storing the instruction in an entry of the issue queue, the entry including a counter field, and further comprising the steps of:
(a) storing a counter value in the counter field when the instruction is issued by the issue queue, the counter value comprising a number one greater than the number of pipeline stages in which the instruction should be successfully executed; and
(b) decrementing the counter field upon the occurrence of each pipeline stage after the instruction is issued.

6. The method of claim 5 wherein the entry in the issue queue includes an availability indicator and further comprising the steps of:
(a) changing the availability indicator to an unavailable status when the instruction is issued from the issue queue; and
(b) changing the availability indicator to an available status in response to the reject signal for the instruction.

7. The method of claim 5 wherein the entry includes a reissue counter field and further comprising the steps of:
(a) detecting a reject condition for the instruction as the execution unit attempts to execute the instruction, the reject condition preventing the execution unit from executing the instruction;
(b) responding to the reject condition by producing the reject signal and storing a reissue counter value in the reissue counter field, the reissue counter value comprising a number of pipeline stages during which the instruction is to be held in the issue queue while the execution unit performs a corrective operation;
(c) decrementing the value in reissue counter field upon the occurrence of each pipeline stage after the reissue counter value is stored in said field until the value in the reissue counter field is equal to zero; and
(d) reissuing the instruction from the issue queue when the value in the reissue counter field is equal to zero.

8. The method of claim 1 further comprising the step of:
(a) removing the instruction from the issue queue when the execution unit fails to produce the reject signal for the instruction within the critical period after the instruction was issued.

9. The method of claim 1 further comprising the step of:
(a) responding to the reject signal for the instruction by retaining the instruction in the issue queue to be reissued.

10. The method of claim 1 further comprising the steps of:
(a) detecting a reject condition for the instruction as the execution unit attempts to execute the instruction, the reject condition preventing the execution unit from executing the instruction;
(b) responding to the reject condition by producing the reject signal;
(c) performing a corrective operation through the execution unit, the corrective operation placing the execution unit in condition to fully execute the instruction;
(d) holding the instruction in the issue queue for an expanded period greater than the critical period, the expanded period being a period in which it is anticipated that the corrective operation will be competed; and
(e) reissuing the instruction from the issue queue after the expanded period.

11. An apparatus for facilitating the rejection of sequential instructions to be executed in a processor, the apparatus comprising:
(a) an issue unit including an issue queue for storing a sequential instruction to be executed and for retaining the instruction for a critical period after the instruction is issued, the critical period comprising a period of time after the instruction is issued during which a reject signal for the instruction is expected; and
(b) an execution unit for receiving the instruction from the issue queue and executing the instruction in the absence of a reject condition for the instruction, the execution unit also being adapted for detecting the reject condition for the instruction and producing the reject signal in response to the reject condition for the instruction.

12. The apparatus of claim 11 wherein the critical period is defined by a critical number of pipeline stages.

13. The apparatus of claim 12 wherein:
(a) the issue queue stores the instruction in an entry of the issue queue;
(b) the entry includes a counter field for storing a counter field value; and
(c) the issue unit is also for decrementing the value in the counter field upon the occurrence of each pipeline stage after the instruction is issued until the value in the counter field is equal to zero.

14. The apparatus of claim 13 wherein:
(a) the entry includes a reissue counter field;
(b) the execution unit is also for responding to the reject condition by providing a reissue counter value to be stored in the reissue counter field;
(c) the issue unit is also for decrementing the value in the reissue counter field upon the occurrence of each pipeline stage after the reissue counter value is stored in said field until the value in the reissue counter field is equal to zero; and
(d) the issue unit is also for causing the issue queue to reissue the instruction when the value in the reissue counter field is equal to zero.

15. The apparatus of claim 14 wherein:
(a) the issue queue entry includes an availability indicator;
(b) the issue unit is also for changing the availability indicator to an unavailable status when the instruction is issued from the issue queue and for changing the availability indicator to an available status when the value in the reissue counter field is equal to zero.

16. The apparatus of claim 13 wherein:
(a) the issue queue entry includes an availability indicator;
(b) the issue unit is also for changing the availability indicator to an unavailable status when the instruction is issued from the issue queue and for changing the availability indicator to an available status in response to the reject signal for the instruction.

17. The apparatus of claim 12 wherein the critical number of pipeline stages is a fixed number for each instruction stored in the issue queue.

18. The apparatus of claim 11 wherein the issue unit is also for:
   (a) removing the instruction from the issue queue in the event that the execution unit fails to produce the reject signal during the critical period.

19. The apparatus of claim 11 wherein the issue unit responds to the reject signal by causing the issue queue to retain the instruction in the issue queue past the critical period and then reissue the instruction.

20. The apparatus of claim 11 wherein the execution unit is adapted to detect any one of a plurality of different reject conditions for the instruction.

* * * * *